United States Patent
Guo et al.

(10) Patent No.: US 6,455,657 B1
(45) Date of Patent: Sep. 24, 2002

(54) PREPARATION OF VINYL AROMATIC-ALLYLIC ALCOHOL COPOLYMERS

(75) Inventors: Shao-Hua Guo, Exton; Wei Wang, Boothwyn; Daniel B. Pourreau, Exton, all of PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/782,900

(22) Filed: Feb. 14, 2001

(51) Int. Cl.7 ............................................. C08F 212/08
(52) U.S. Cl. ............................ 526/347; 526/86; 526/87
(58) Field of Search ........................... 526/86, 87, 347, 526/79

(56) References Cited

U.S. PATENT DOCUMENTS

| | | | |
|---|---|---|---|
| 2,588,890 A | 3/1952 | Shokal et al. ............... 260/407 |
| 2,630,430 A | 3/1953 | Shokal et al. ............... 260/88.1 |
| 2,894,938 A | 7/1959 | Chapin et al. .............. 260/88.1 |
| 2,900,359 A | 8/1959 | Chapin et al. ................ 260/43 |
| 2,940,946 A | 6/1960 | Shokal et al. .................. 260/23 |
| 5,382,642 A * | 1/1995 | Guo ...................... 526/347 X |
| 5,444,141 A | 8/1995 | Guo ........................... 526/347 |
| 5,886,114 A | 3/1999 | Guo ............................ 526/86 |
| 6,103,840 A | 8/2000 | Guo ............................ 526/73 |

* cited by examiner

*Primary Examiner*—Fred Teskin
(74) *Attorney, Agent, or Firm*—Shao Guo

(57) ABSTRACT

A process for preparing vinyl aromatic-allylic alcohol copolymers, such as styrene-allyl alcohol (SAA) copolymers, is disclosed. The process is conducted in the presence of a solvent, which enables the preparation of copolymers having both low hydroxyl functionalities and low molecular weights. SAA copolymers produced by the process have an average hydroxyl functionality less than about 4.

9 Claims, No Drawings

PREPARATION OF VINYL AROMATIC-ALLYLIC ALCOHOL COPOLYMERS

FIELD OF THE INVENTION

The invention relates to the preparation of vinyl aromatic-allylic alcohol copolymers. In particular, the invention relates to the preparation of copolymers having low molecular weights and low hydroxyl functionality.

BACKGROUND OF THE INVENTION

Styrene-allyl alcohol (SM) copolymers are known. U.S. Pat. Nos. 2,588,890 and 2,630,430 teach copolymerzing styrene with allyl alcohol in the presence of oxygen as a catalyst. The SM copolymer thus prepared has high gel content and inferior properties.

U.S. Pat. Nos. 2,894,938 and 2,900,359 teach copolymerizing styrene with allyl alcohol using organic peroxides as initiators in the absence of oxygen. The polymerization is conducted in a bulk process by charging allyl alcohol, styrene and an initiator into a reactor and heating the reaction mixture to a polymerization temperature (180° C. to 300° C.). The SAA copolymer has a low gel content and a functionality greater than 4.

U.S. Pat. No. 2,940,946 teaches a semi-batch process for making SAA copolymers. The process is conducted by initially charging allyl alcohol, an initiator, and a portion of styrene into a reactor, and adding the remaining styrene gradually into the reaction mixture during the polymerization. The copolymer has low color and improved thermal stability.

U.S. Pat. Nos. 5,444,141 and 5,886,114 teach the preparation of SAA copolymers by initially charging allyl alcohol, a portion of styrene and a portion of an initiator into a reactor and gradually adding the remaining styrene and initiator into the reaction mixture during the polymerization. The process gives substantially higher yields compared with the process disclosed in U.S. Pat. No. 2,940,946.

U.S. Pat. No. 6,103,840 teaches an improved process over that of U.S. Pat. No. 5,444,141. The process is conducted by increasing the reaction temperature during the addition of styrene and initiator. The process gives even higher yields of SAA copolymers.

All of the known processes are conducted without the use of a solvent. These processes invariably produce SAA copolymers having hydroxyl functionality (i.e., the number of hydroxyl groups per polymer chain) greater than 4 without using oxygen as a catalyst. When oxygen is used, the copolymers have lower functionality, but they also have high gel content and other inferior properties.

SAA-100 and SAA-101 have been commercially produced for several decades. They have 70/30 and 60/40 molar ratios of recurring units of styrene to allyl alcohol, respectively. Although these SAA copolymers differ in the hydroxyl content or hydroxyl number (OH#, SAA-100: 200 mg KOH/g; SAA-101: 255 mg KOH/g), they have essentially the same hydroxyl functionality (about 5). High hydroxyl functionality of the copolymers gives SAA-based coatings high crosslinking density. However, high functionality also limits the use of the copolymers in many areas, such as in the synthesis of polyester resins where SAA can cause gel formation.

Attempts to reduce the hydroxyl functionality of SAA copolymers have been made. One might try to reduce hydroxyl functionality by reducing the concentration of allyl alcohol during polymerization. This approach fails, however, because the current SAA polymerization process inherently gives higher molecular weight polymers when less allyl alcohol is used. For example, we have recently introduced SAA-103, which has only about 20 mole % of the recurring units of allyl alcohol (hydroxyl number: 125 mg KOH/g). Surprisingly, SAA-103 has even higher hydroxyl functionality (about 7) than SAA-100 or SAA-101. While SAA-103 has a lower concentration of hydroxyl groups, it also has much longer chains, so the number of hydroxyl groups per polymer chain is actually higher than SAA-100 or SAA-101.

A new process for producing SAA copolymers is needed. Ideally, the process would produce SAA copolymers having low hydroxyl functionality and low molecular weights.

SUMMARY OF THE INVENTION

The invention is a process for making copolymers of a vinyl aromatic monomer and an allylic alcohol. The process is performed in the absence of oxygen. The process begins with charging a reactor with an allylic alcohol, 0–50% of the total amount to be used of a vinyl aromatic monomer, 0–100% of the total amount to be used of a free-radical initiator and an organic solvent in an amount greater than or equal to about 10% by weight of the total amount of the vinyl aromatic monomer. The reaction mixture is then heated at a temperature within the range of about 100° C. to about 185° C. The remaining vinyl aromatic monomer and initiator are added to the reaction mixture at a decreasing rate during the polymerization.

DETAILED DESCRIPTION OF THE INVENTION

In the process of the invention, a reactor is initially charged with an allylic alcohol. Allylic alcohols useful in the process preferably have the general structure:

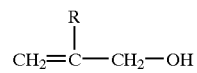

in which R is selected from hydrogen, a $C_1$–$C_{10}$ alkyl group, or a $C_6$–$C_{10}$ aryl group. Examples of suitable allylic alcohols are allyl alcohol, methallyl alcohol, and 2-ethyl-2-propen-1-ol. Mixtures of allylic alcohols can be used. Allyl alcohol is preferred because it is commercially available and inexpensive.

The amount of allylic alcohol to be used is determined by many factors. They include the desired hydroxyl number of the copolymer, the reaction temperature, the amount of vinyl aromatic monomer to be used, the amount of initiator to be used, and the manner of the addition of the vinyl aromatic monomer and the initiator. Determining how much allylic alcohol to be used is further complicated by the low reactivity of allylic alcohols. Allylic monomers have much lower reactivity than vinyl aromatic monomers. The great disparity in the monomeric reactivities requires a large excess of allylic alcohols in the reaction mixture to achieve an adequate incorporation of allylic alcohols in the copolymer. In general, more than 25% of excess allylic alcohol is needed. The unreacted allylic alcohol is removed from the polymer after polymerization and is reused.

The reactor is initially charged with 0–50% of the total amount to be used of a vinyl aromatic monomer. Suitable vinyl aromatic monomers preferably have a —CR'=$CH_2$ group connected to an aromatic group. R' is hydrogen or a $C_1$ to $C_{10}$ alkyl group. Examples of suitable vinyl aromatic monomers are styrene, α-methylstyrene, ρ-methylstyrene, ρ-t-butylstyrene, 9-vinylanthracene, 2-vinylnaphthalene, and the like, and mixtures thereof. Styrene is particularly preferred. The total amount of vinyl aromatic monomer to be used is determined mainly by the desired copolymer composition. Vinyl aromatic monomers polymerize essentially completely.

The remaining vinyl aromatic monomer is gradually added, at a decreasing rate, into the reactor during the course of polymerization. At least 50% of the vinyl aromatic monomer is added to the reaction mixture gradually during the polymerization. Preferably, the ratio of the vinyl aromatic monomer to allylic alcohol is kept essentially constant so that the copolymer produced has a relatively uniform composition.

The process comprises initially charging the reactor with 0–100% of the total amount of a free-radical initiator. Suitable free-radical initiators include peroxides, hydroperoxides, peresters, azo compounds, and many others known to the polymer industry. Examples of suitable free-radical initiators are hydrogen peroxide, di-t-butyl peroxide, t-butyl hydroperoxide, cumene hydroperoxide, t-butyl perbenzoate, 2,2'-azobisisobutyronitrile, and the like, and mixtures thereof. The total amount of the initiator to be used is determined by many factors, but mainly by the desired polymerization rate. When more initiator is used, faster polymerization is achieved. Surprisingly, the molecular weight of the copolymer does not vary significantly with the change of the initiator concentration.

It is preferred to add at least 50% of the total amount to be used of the initiator to the reactor gradually during the course of the polymerization. It is also desirable to keep the ratio the free-radical initiator to the vinyl aromatic monomer essentially constant so that the copolymer produced has narrow molecular weight distribution.

The process is performed in the absence of oxygen. The process comprises charging the reactor with an organic solvent in an amount greater than or equal to about 10% by weight of the total amount of the vinyl aromatic monomer. Preferably, the solvent is charged initially into the reactor. Alternatively, the solvent is charged partly into the reactor initially, and the remaining is added during the polymerization. Preferably, the solvent is used in an amount greater than about 20 wt % of the total amount of the vinyl aromatic monomer. More preferably, the amount of solvent is greater than about 50 wt % of the total amount of the vinyl aromatic monomer. Suitable solvents are those in which the copolymer is soluble under the polymerization conditions. They include $C_4$–$C_{18}$ linear or cyclic aliphatic hydrocarbons, $C_8$–$C_{18}$ aromatic hydrocarbons, esters, ethers, ketones, alcohols, glycol ethers, and the like, and mixtures thereof. Examples of suitable solvents are toluene, xylenes, cyclohexane, methyl amyl ketone, butyl acetate, and propylene glycol methyl ether acetate. Toluene and xylenes are preferred. We surprisingly found that the use of an organic solvent enables the preparation of SAA copolymers having both low molecular weight and low hydroxyl functionality.

The polymerization is conducted at a temperature within the range of about 100° C. to about 185° C. Increasing temperature reduces the disparity of the monomeric reactivities between the vinyl aromatic monomer and the allylic alcohol, and thus enhances the incorporation of the allylic monomer into the copolymer. However, increasing temperature also induces high pressure, which increases the risk of the operation. When allyl alcohol is used, the polymerization is preferably performed under relatively low pressure because allyl alcohol is highly toxic. Preferably, the polymerization is conducted at a temperature from about 125° C. to about 165° C.

The invention includes copolymers made by the process. The copolymers differ from those known in the art in that they have lower hydroxyl functionality. The copolymers have an average hydroxyl functionality less than about 4. Preferably, the copolymers have average hydroxyl functionality from about 1.5 to about 2.5. The copolymers made by the process of the invention not only have low hydroxyl functionality but also have essentially no gel content. By "gel," we mean that the polymer is crosslinked during the polymerization and becomes partially insoluble in the solvent. When a polymer has no gel content, its solution is clear. In addition, the copolymers have much lower solution viscosity than the existing products.

Preferably, the copolymers have a number average molecular weight from about 1,000 to about 3,000 and a molecular weight distribution from about 1.5 to about 5.5. The copolymers preferably have a hydroxyl number from about 30 mg KOH/g to about 150 mg KOH/g. The preferred copolymer made by the process is a styrene-allyl alcohol copolymer.

The following examples merely illustrate the invention. Those skilled in the art will recognize many variations that are within the spirit of the invention and scope of the claims.

EXAMPLE 1

Preparation of Low Functionality SAA

A one-liter stainless-steel reactor equipped with an agitator, an oil heating jacket, a temperature controller, a nitrogen purge device, a vacuum distillation device, and an addition pump, is charged with allyl alcohol (40 g) and xylenes (175 g). Styrene (250 g) and T-hydro 70 (30 g, 70% aqueous solution of t-butyl hydroperoxide, product of Lyondell Chemical) are mixed, chilled to 5° C., purged with nitrogen, and then charged to the addition pump. The reactor is purged three times with nitrogen, sealed, and the contents are heated to 145° C. The mixture of styrene and initiator is added to the reactor gradually at a decreasing rate over five hours while maintaining the reaction temperature at 145° C. The addition rate is hour 1: 90 g; hour 2: 75 g; hour 3: 60 g; hour 4: 40 g; and hour 5: 15 g. The reaction mixture is kept at 145° C. for another 0.5 hour following monomer and initiator addition. Unreacted monomers and solvent are removed by vacuum distillation (maximum temperature: 150° C.). The solid SAA copolymer is discharged from the reactor at 25° C. The SAA copolymer has number average molecular weight (Mn) 1800, weight average molecular weight (Mw) 4400, hydroxyl number (OH#) 64.1 mg KOH/g, and Tg: 66° C. It has average hydroxyl functionality (calculated based on Mn and OH#) 2.06.

EXAMPLE 2

Preparation of Low Functionality SAA

A one-liter stainless-steel reactor equipped as in Example 1 is charged with allyl alcohol (62.5 g), styrene (37 g), di-t-butyl peroxide (7.5 g) and xylenes (175 g). Additional styrene (175 g) and di-t-butyl peroxide (6.7 g) are mixed, chilled to 5° C., purged with nitrogen, and then charged to the addition pump. The reactor is purged three times with nitrogen, sealed, and the contents are heated to 155° C. The mixture of styrene and initiator is added to the reactor gradually at a decreasing rate over eight hours while maintaining the reaction temperature at 155° C. The addition rate is hour 1: 34.7 g; hour 2: 33.0 g; hour 3: 28.8 g; hour 4: 25.2 g; hour 5: 21.0 g; hour 6: 18.4 g; hour 7: 12.7; and hour 8: 7.9 g. The reaction mixture is kept at 155° C. for another 0.5 hour following monomer and initiator addition. Unreacted monomers and solvent are removed. The solid SAA copolymer is discharged from the reactor at 25° C. The SAA copolymer has Mn 1910, Mw 3990, OH# 61.8 mg KOH/g, and Tg 65° C. It has average hydroxyl functionality 2.1.

EXAMPLE 3

Preparation of Low Functionality SAA

Example 2 is repeated, but the polymerization temperature is 145° C. rather than 155° C. The SAA copolymer has Mn 2380, Mw 5610, OH# 60.6 mg KOH/g, and Tg 73.8° C. It has average hydroxyl functionality 2.57.

EXAMPLE 4

Preparation of Low Functionality SAA

Example 2 is repeated, but the reactor is charged with 125 grams, rather than 62.5 grams, of allyl alcohol and the polymerization temperature is 145° C. rather than 155° C. The SAA copolymer has Mn 2164, Mw 4690, OH# 94.7 mg KOH/g, and Tg 64.7° C. It has average hydroxyl functionality 3.65.

COMPARATIVE EXAMPLE 5

Preparation of SAA-100

An SAA copolymer is prepared in the absence of a solvent according to the method of U.S. Pat. No. 5,444,141. Thus, allyl alcohol (500 g), styrene (67 g), and di-t-butylperoxide (16 g) are charged to a one-liter stainless-steel reactor equipped as in Example 1. After purging three times with nitrogen, the reactor is sealed, and the contents are heated to 145° C. Di-t-butylperoxide (8 g) is mixed with styrene (234 g), and this mixture is pumped into the reactor over seven hours at 145° C. at a decreasing rate: hour 1: 50 g; hour 2: 45 g; hour 3: 40 g; hour 4: 35 g; hour 5: 30 g; hour 6: 24 g; and hour 7: 18 g. Heating continues at 145° C. for an additional 0.5 hour. Unreacted monomers are removed. The SAA copolymer (322 g) has OH# 199 mg KOH/g, Mn 1500, and Mw 3400. It has hydroxyl functionality 5.3.

COMPARATIVE EXAMPLE 6

Preparation of SAA-100

Allyl alcohol (500 g), styrene (67 g), and di-t-butylperoxide (16 g) are charged to a one-liter stainless-steel reactor equipped as in Example 1. After purging three times with nitrogen, the reactor is sealed, and the contents are heated to 135° C. Styrene (134 g) is pumped into the reactor over five hours at 135° C. at a decreasing rate: hour 1: 48 g; hour 2: 32 g; hour 3: 24 g; hour 4:18 g; and hour 5: 12 g. Heating continues at 135° C. for an additional 0.5 hour. Unreacted monomers are removed. The SAA copolymer (208 g) has OH# 195 mg KOH/g, Mn 1430, and Mw 3400. It has hydroxyl functionality 5.0.

COMPARATIVE EXAMPLE 7

Preparation of SAA-101

Allyl alcohol (500 g), styrene (43 g), and di-t-butylperoxide (12 g) are charged to a one-liter stainless-steel reactor as in Example 1. After purging three times with nitrogen, the reactor is sealed, and the contents are heated to 145° C. Di-t-butylperoxide (6 g) is mixed with styrene (151 g), and this mixture is pumped into the reactor over seven hours at 145° C. at a decreasing rate: hour 1: 34 g; hour 2: 29 g; hour 3: 26 g, hour 4: 23 g; hour 5: 19 g; hour 6: 15 g; and hour 7: 11 g. Heating continues at 145° C. for an additional 0.5 hour. Unreacted monomers are removed. The SAA copolymer (209 g) has OH# 251 mg KOH/g, Mn=1100, and Mw=2260. It has hydroxyl functionality 4.9.

COMPARATIVE EXAMPLE 8

Preparation of SAA-103

SAA-103 is prepared in the absence of a solvent according to the method of U.S. Pat. No. 5,886,114. Thus, allyl alcohol (1000 g), styrene (353 g), and di-t-butylperoxide (76 g) are charged to a five-liter/stainless-steel reactor equipped similarly to Example 1 but separately having a monomer addition pump and an initiator addition pump. After purging three times with nitrogen, the reactor is sealed, and the contents are heated to 145° C. Styrene (1225 g) is charged to the monomer addition pump and /di-t-butylperoxide (35.8 g) is charged to the initiator addition pump. Styrene and di-t-butylperoxide are added gradually to the reactor over seven hours at 145° C. at decreasing rates. The styrene addition rate is hour 1: 246 g; hour 2: 235 g; hour 3: 207 g; hour 4: 179 g; hour 5: 150 g, hour 6: 129 g, and hour 7: 89 g. The di-t-butyl peroxide addition rate is hour 1: 8.0 g; hour 2: 6.5 g; hour 3: 6.0 g; hour 4: 5.0 g; hour 5: 4.5 g; hour 6: 3.5 g; and hour 7: 2.5 g. Heating continues at 145° C. for an additional 0.5 hour. Unreacted monomers are removed. The SAA copolymer (1492 g) OH# 125 mg KOH/g, Mn=3200, and Mw=8400. It has hydroxyl functionality 7.1.

In sum, the process of the invention, in which a solvent is used, gives SAA copolymers having hydroxyl functionality less than 4 (see Examples 1–4). More interestingly, the process enables us to prepare SAA copolymers that have a hydroxyl functionality of about 2 (see Examples 1–3). In contrast, without the addition of a solvent, the SAA copolymers have a hydroxyl functionalities greater than 4 (see Comparative Examples 5–8).

EXAMPLE 9

Solution Viscosity of SAA Copolymers

SAA copolymers are dissolved in a variety of solvents listed in Table 2 by 50 wt % of solids. Brookfield viscosity of the solutions is measured at 25° C. As shown in Table 2, the new SAA copolymer of Example 1 has much lower solution viscosity than commercial SAA copolymers. The low solution viscosity makes the new SAA copolymers valuable for ultra-high solids coatings.

TABLE 2

Viscosity (cps) of SAA Solutions at 50% Solids and 25° C.

|  | Ex 1 | C5 SAA-100 | C7 SAA-101 | C8 SAA-103 |
|---|---|---|---|---|
| Methyl Ethyl Ketone | 17 | 213 | 329 | 32 |
| Methyl Iso-butyl Ketone | 46 | 172 | 240 | 69 |
| Butyl Acetate | 56 | — | — | 118 |
| Propylene Glycol Methyl Ether Acetate | 161 | 196 | 726 | 319 |

TABLE 2-continued

Viscosity (cps) of SAA Solutions at 50% Solids and 25° C.

|  | Ex 1 | C5 SAA-100 | C7 SAA-101 | C8 SAA-103 |
|---|---|---|---|---|
| Toluene | 57 | 1230 | 9320 | 380 |
| Xylenes | 81 | Insoluble | Insoluble | 1500 |

We claim:

1. A process for making a copolymer of a vinyl aromatic monomer and an allylic alcohol, said process comprising:
    (a) charging a reactor with an allylic alcohol, 0–50% of the total amount to be used of a vinyl aromatic monomer, 0–100% of the total amount to be used of a free-radical initiator; and an organic solvent in an amount greater than or equal to about 10% by weight of the total amount of the vinyl aromatic monomer;
    (b) heating the reaction mixture at a temperature within the range of about 100° C. to about 185° C., and;
    (c) gradually adding to the reaction mixture, at a decreasing rate, the remaining vinyl aromatic monomer and free-radical initiator, wherein the copolymer produced has an average hydroxyl functionality less than about 4.

2. The process of claim 1 wherein the copolymer has a hydroxyl functionality within the range of about 1.5 to about 2.5.

3. The process of claim 1 wherein the vinyl aromatic monomer is selected from the group consisting of styrene, α-methylstyrene, ρ-methylstyrene, ρ-t-butylstyrene and mixtures thereof.

4. The process of claim 1 wherein the allylic alcohol is selected from the group consisting of allyl alcohol, methallyl alcohol, and a mixture thereof.

5. The process of claim 1 wherein the allylic alcohol is allyl alcohol.

6. The process of claim 1 wherein the vinyl aromatic monomer is styrene.

7. The process of claim 1 wherein the allylic alcohol is allyl alcohol and the vinyl aromatic monomer is styrene.

8. A process for making a styrene-allyl alcohol copolymer in the absence of oxygen, said process comprising:
    (a) charging a reactor with allyl alcohol, 0–50% of the total amount to be used of styrene, 0–100% of the total amount to be used of a free-radical initiator; and an aromatic hydrocarbon in an amount greater than or equal to about 10% by weight of the total amount of the vinyl aromatic monomer;
    (b) heating the reaction mixture at a temperature within the range of about 100° C. to about 185° C., and;
    (c) gradually adding to the reaction mixture, at a decreasing rate, the remaining styrene and free-radical initiator, wherein the copolymer produced has an average hydroxyl functionality less than about 4.

9. A styrene-allyl alcohol copolymer having a hydroxyl functionality within the range of about 1.5 to about 2.5 and having essentially no gel content.

* * * * *